Jan. 8, 1924.
I. C. GAMBEE
ANIMAL TRAP
Filed June 28, 1922
1,479,853
2 Sheets-Sheet 1
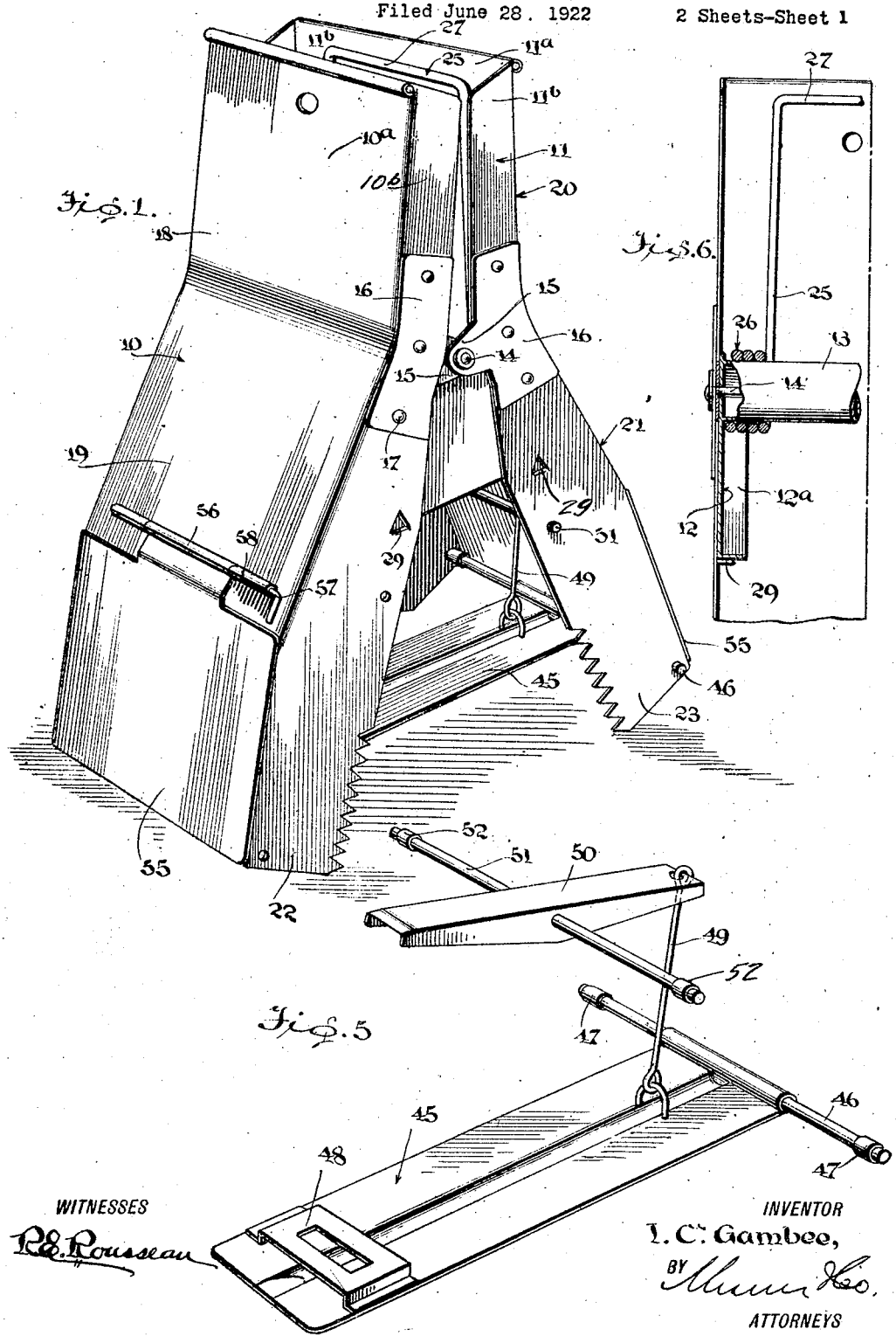
WITNESSES
R.E. Rousseau
INVENTOR
I. C. Gambee,
BY
ATTORNEYS Jan. 8, 1924.
I. C. GAMBEE
ANIMAL TRAP
Filed June 28, 1922
1,479,853
2 Sheets-Sheet 2
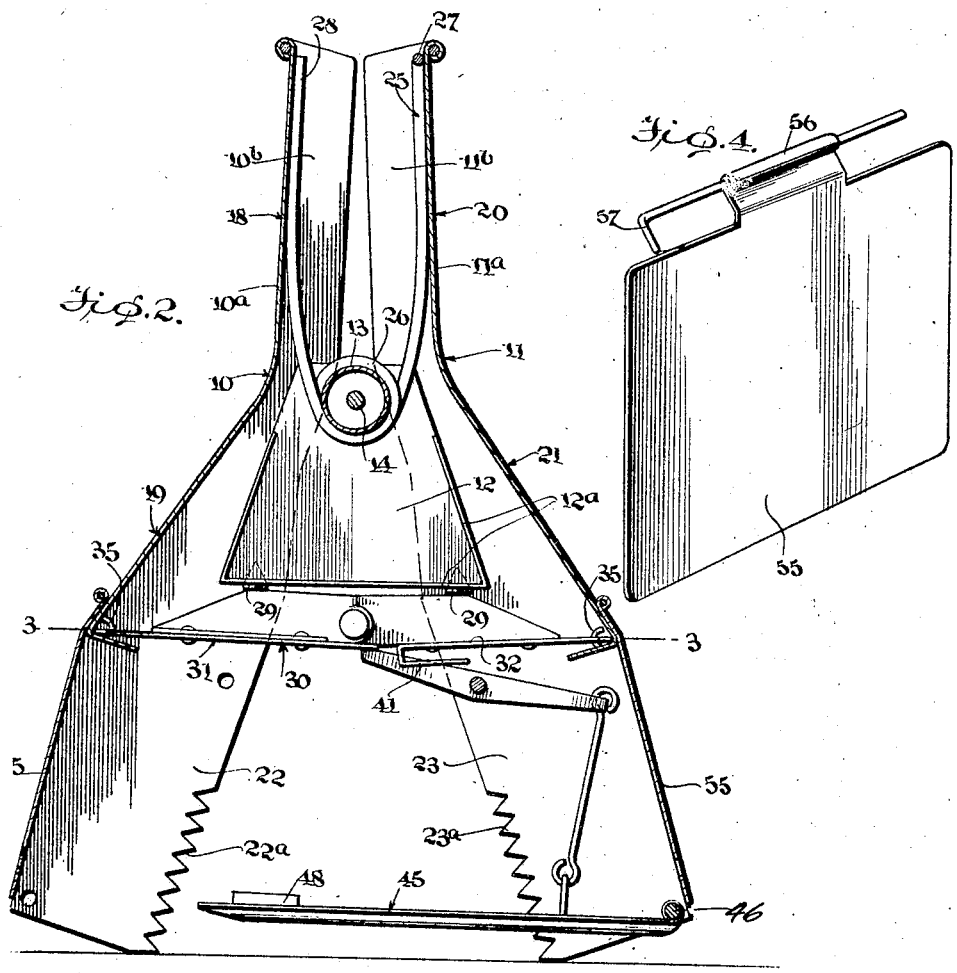
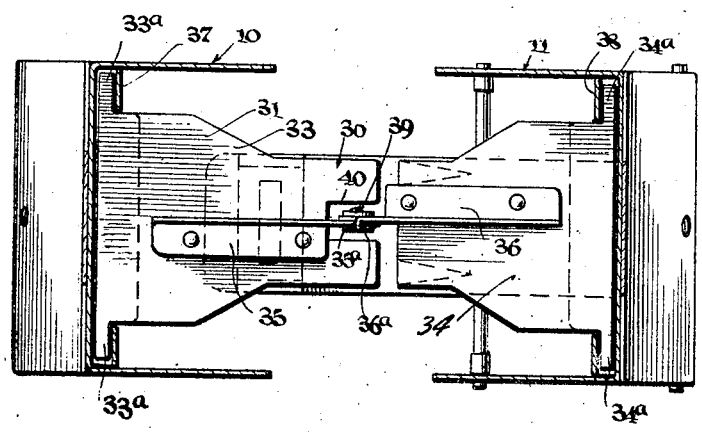
INVENTOR
I. C. Gambee,
BY
ATTORNEYS Patented Jan. 8, 1924.

1,479,853

UNITED STATES PATENT OFFICE.

ISAAC CHARLES GAMBEE, OF SEATTLE, WASHINGTON.

ANIMAL TRAP.

Application filed June 28, 1922. Serial No. 571,348.

*To all whom it may concern:*

Be it known that I, ISAAC CHARLES GAMBEE, a citizen of the United States, and a resident of Seattle, in the county of King and State of Washington, have invented certain new and useful Improvements in Animal Traps, of which the following is a specification.

The present invention relates to an improvement in animal traps which is convertible so as to be adapted either for the trapping of moles or for rats, weasels or other animals.

The object of the invention is to provide a trap of this character which is highly effective in use in that it insures the capture and destruction of the animal and which at the same time may be set without exposing any part of the body to injury by the jaws of the trap.

Another object is to provide a device of this character which is of simple and durable construction, reliable in operation and easy and comparatively inexpensive to manufacture.

Other objects and advantages of the invention reside in certain novel features of the construction, combination and arrangement of parts which will be hereinafter more fully described and particularly pointed out in the appended claims, reference being had to the accompanying drawings forming part of this specification, and in which:

Figure 1 is a perspective view, showing the trap set;

Figure 2 is a view in longitudinal vertical section;

Figure 3 is a view in horizontal section on line 3—3 of Figure 2;

Figure 4 is a detail perspective view of one of the aprons and its removable pivot pin;

Figure 5 is a detail perspective view of the trigger mechanism, showing the same detached; and Figure 6 is a fragmentary detail view, partly in section and partly in side elevation and illustrating the construction of the spring and the mounting thereof.

Referring to the drawings wherein for the sake of illustration is shown the preferred embodiment of the invention it will be seen that the trap comprises in general a pair of channel members indicated generally at 10 and 11, respectively, and each including base sections, designated at $10^a$ and $11^a$, respectively, and side flanges, designated at $10^b$ and $11^b$, respectively. The channel members are pivotally mounted on a frame comprising a pair of side plates 12 having flanged edges $12^a$. These side plates are held in proper spaced relation by a spacing sleeve or cylinder 13 and pivot pin or bolt 14, the spacing sleeve abutting the plate at its ends and the pivot bolt extending through the plates and projecting beyond the same. The projecting ends of the pivot pin 14 are received in the apertures of pivot ears 15 formed on attaching plates 16 riveted, bolted or otherwise secured, as at 17 to the flanges of the channel members.

The channel members 10 and 11 are preferably constructed of resilient metal and are bent or otherwise formed to provide upper and lower angularly disposed sections, the sections of the channel member 10 being designated at 18 and 19 and the sections of the channel member 11 being indicated at 20 and 21. The side flanges of the sections 19 and 21 of the channel members are provided with extensions designated at 22 and 23, respectively, and the confronting edges of these extensions are toothed, as at $22^a$ and $23^a$ so as to constitute the jaws of the trap. The sections 19 and 21 may thus be said to constitute the jaw members and the sections 18 and 20 the handle members of the trap.

Means is provided for urging the jaws into engagement with each other so as to capture and destroy the animal and preferably this means comprises a spring designated generally at 25 and constructed of a single piece of resilient wire, the spring having coils 26 mounted on the sleeve 13, a bail 27 connected to the coils and abutting the base member $11^a$ of the channel member 11 and arms 28 also connected to the coils but engaging the section $10^a$ of the channel member 10, as shown in Figure 2. The spring 25 is tensioned to throw the jaws forcibly into engagement with each other and the sections 18 and 20 constituting the handle members of the trap afford a ready means for compressing this spring and further increasing its tension when the trap is set as will be hereinafter more fully described. These sections of the channel members also house and protect the spring.

Stop lugs 29 are pressed from or carried by flanges of the channel members, as shown in Figures 1, 2 and 6 and are engageable with the lower flanged edges 12ª of the side plates to limit the opening or spreading movement of the jaws in setting the trap.

Tripping mechanism is provided for releasably maintaining the trap set and includes a toggle, designated generally at 30 and arranged within and coacting with the sections 19 and 21 of the channel members. The toggle includes a toggle arm 31 and an arm 32. The arms 31 and 32 are each made up of flat plates, designated at 33 and 34, respectively, and angle pieces, designated at 35 and 36, respectively. The arms 31 and 32 are pivotally connected to the channel members 10 and 11, respectively, by means of trunnions 33ª and 34ª provided upon the plates 33 and 34 respectively and journaled in bearings 37 and 38 respectively, the bearings being provided upon the channel members 10 and 11. The angle pieces 35 and 36 are oppositely arranged and are pivotally connected by means of a pivot 39. An offset lug 36ª is provided on the angle piece 36 and is cooperable with a shoulder 35ª provided on the angle piece 35 to limit the downward swinging movement of the arms of the toggle. Limiting the downwardly swinging movement of the toggle is permitted by virtue of the fact that the portion of the plate 33 which underlies the pivot 39 is cutaway, as indicated at 40. Bait hooks 41 are provided upon the plate 34 of the arm 32.

When the tripping mechanism is set, as shown in Figure 2, the arms 31 and 32 of the toggle which makes up the tripping mechanism are so disposed that the axis of the pivot which connects them to each other are disposed in a horizontal plane below the axes of the pivots which connect these arms to the channel members. As the spring 25 urges the jaws of the trap toward each other the tendency will be to swing the arms 31 and 32 downwardly but this downward swinging movement is limited by the engagement of the shoulder 36ª with the shoulder 35ª and so the toggle serves to maintain the jaws spread and the trap set. If, however, an animal should touch the toggle so as to displace the pivot point upwardly for a slight distance the trap would be sprung for as soon as the axis of the pivot 39 reaches a point immediately above the horizontal line between the pivots 37 and 38 the spring will tend to urge the arm of the toggle upwardly. This is what will occur when an animal attempts to disengage the bait from the hooks 41. When the trap is to be used as a mole trap it is complete as thus far described and when due to this use its jaws constituted by the extensions 22 and 23 of the side flanges are inserted in the loose earth about the run-way of the mole with the toothed edges spanning and just beyond the walls of the run-way, the toothed edges 22ª being on one side of the run-way and the toothed edges 23 being on the opposite side thereof. The earth around the run-way is well packed in and the toggle abuts this earth on the top. Then when the animal attempts to rebore his hole he presses the toggle upwardly and when the pivot 35 is above the horizontal line between the pivotal connections of the arms to the channel members, the spring 35 is effective to forcibly throw the jaws toward each other, thereby clutching or capturing the mole and effecting its destruction.

In order to insure the springing of the trap on the animal trigger mechanism is provided for positively urging the arms of the toggle upwardly so as to spring the trap. It is especially desirable to positively actuate the tripping mechanism when the trap is used for trapping rats, weasels or other animals above the ground. This trigger mechanism includes a tread plate 45 fixed to a shaft 46 pivotally supported upon the extensions 23, the shaft 46 having stop collars 47 formed thereon and engageable with the extensions 23 to prevent accidental displacement of the shaft. The extensions 23 being of resilient metal may be spread to permit of assembly of the shaft but spring back to snugly abut the collars 47. A bait holder 48 is provided upon the tread plate. The tread plate is connected by a link 49 with a rock arm 50 mounted upon a shaft 51 also having stop collars 52 and journaled in an extension 23. The rock arm being directly engageable with the arms of the toggle to positively urge them upwardly when an animal steps upon or displaces the tread plate 45.

When the trap is used above the ground aprons or closure plates 55 are preferably provided for spanning and closing the space between the extensions of the side flanges of the channel members. The aprons 55 being releasably and pivotally mounted upon the channel members by means of pivot ears 56 integrally formed therewith and engaged by a pivot pin 57 supported in pivot ears 58 formed upon the channel members.

In setting the trap the sections 18 and 20 are grasped and thrown toward each other. These sections constituting convenient handle means whereby the trap may be set since when these sections are drawn toward each other the spring 25 is further depressed or tensioned. Moreover as the sections 18 and 20 are drawn toward each other the sections 19 and 21 are spread so that the arms 31 and 32 of the toggle swing or fall downwardly by gravity thereby carrying the pivot 39 connecting the arms below the horizontal plane which intersects the pivotal connection of the toggle arms with the channel members. Obviously when the pivot is so located the trap is set since the shoulders 35ª and 36ª are engaged and held in engagement with each other by the action of the spring. However, when the pivot 27 is displaced upwardly either by the action of the animal directly against the toggle or by the animal depressing the tread plate 45, the shoulders 35ª and 36ª are swung away from each other and the arms 31 and 32 of the toggle are moved upwardly permitting the jaws of the trap to swing forcibly toward and into engagement with each other all under the action of the spring 25.

The trigger mechanism may be readily associated or disassociated with the trap since the shafts 46 and 51 are readily assembled with the extensions 23 or taken therefrom. The same is true of the aprons 55 which may be readily taken from or assembled with the channel members by simply removing the pivot pin 57 thus the trap may be readily used and easily converted into a mole trap or to a rat or other animal trap, and in either use it is highly effective and brings about the capture and destruction of the animal.

I claim:

1. In a trap, a pair of channel members pivotally connected together and including a base section and flanges, said channel members comprising upper and lower angularly disposed sections, the side flanges of the lower sections having extensions provided with toothed edges and constituting the jaws of the trap, a spring coacting with the upper sections of the channel members for urging the jaws toward and in engagement with each other, trigger mechanism including a toggle coacting with the lower sections of the channel members, a trip plate, a trip arm engageable with the toggle for releasing the same, and a link connecting the trip plate and the trip arm, and removable closure plates releasably secured to the lower sections and extending between the jaws.

2. In a trap, a frame including side plates, a spacing sleeve extending between the side plates, a pivot bolt extending through the spacing sleeve and through the side plates and projecting at its ends beyond said side plates, a pair of channel members each including a base section and side flanges, attaching plates secured to the side flanges of the channel members and having pivot ears mounted upon said pivot bolt, said channel members having jaws and a spring including coils embracing the spacing sleeve, a bail engaging one of the channel members and arms engaging the other channel member, and trigger mechanism coacting with the lower sections for maintaining the trap set.

3. In a convertible mole and animal trap, a pair of channel members pivotally connected to each other and including jaw members, spring means for urging said jaw members into operative engagement, and trigger mechanism including a toggle comprising a pair of arms pivotally connected to each other and directly and pivotally connected to the jaw members of the trap, the arms of the toggle having cooperating means adjacent the pivotal connection of said arms to each other for limiting the downward movement of said arms at said pivotal connection, said cooperating means being adapted to function to limit the downward movement of the arms when the pivotal connection of the arms to each other is disposed slightly below the plane of the pivotal connection of said arms to the jaw members, and removable trip mechanism comprising a trip plate pivotally mounted on one of the jaw members below the arms of the toggle and extending toward the other jaw member, and means connected with the trip plate and engagement with the arms of the toggle for exerting an upward thrust thereon when said trip plate is depressed.

ISAAC CHARLES GAMBEE.